(12) United States Patent
Saito

(10) Patent No.: US 7,880,742 B2
(45) Date of Patent: Feb. 1, 2011

(54) INFORMATION PROCESSING DEVICE, DATA TRANSMISSION METHOD, AND ELECTRONIC APPARATUS

(75) Inventor: Katsu Saito, Saitama (JP)

(73) Assignee: Sony Computer Entertainment Inc., Tokyo (JP)

( * ) Notice: Subject to any disclaimer, the term of this patent is extended or adjusted under 35 U.S.C. 154(b) by 477 days.

(21) Appl. No.: 11/328,422

(22) Filed: Jan. 9, 2006

(65) Prior Publication Data

US 2006/0152513 A1 Jul. 13, 2006

Related U.S. Application Data

(63) Continuation of application No. PCT/JP2005/010830, filed on Jun. 14, 2005.

(30) Foreign Application Priority Data

Oct. 6, 2004 (JP) ............... 2004-293459

(51) Int. Cl.
*G06F 13/14* (2006.01)
*G06F 15/16* (2006.01)
*G06F 13/00* (2006.01)
(52) U.S. Cl. .................. 345/520; 345/503; 345/537; 345/538
(58) Field of Classification Search ................. 345/519, 345/520, 503, 537, 538
See application file for complete search history.

(56) References Cited

U.S. PATENT DOCUMENTS 5,907,329 A * 5/1999 Nobutani et al. ............ 345/537
5,941,968 A * 8/1999 Mergard et al. ............. 710/308
7,073,026 B2 * 7/2006 Alsup ........................ 711/118
7,245,272 B2 * 7/2007 Shiuan et al. ............... 345/2.2
2002/0046229 A1 * 4/2002 Yutaka et al. ............... 709/102

FOREIGN PATENT DOCUMENTS

| JP | 9-297854 | 11/1997 |
| JP | 2002-202964 | 7/2002 |

OTHER PUBLICATIONS

International Preliminary Report on Patentability and the Written Opinion of the International Searching Authority dated Apr. 11, 2007, from corresponding International Application PCT/JP2005/010830.
Notification of Reason(s) for Refusal dated Jul. 31, 2007, for the corresponding Japanese Patent Application No. 2004-293459.

* cited by examiner

*Primary Examiner*—Hau H Nguyen
(74) *Attorney, Agent, or Firm*—Katten Muchin Rosenman LLP

(57) ABSTRACT

An information processing device in which a data bus for establishing interconnection between a plurality of control operating units formed in a main processor is connected at one end to a graphic processor and at the other end to a main memory. Image frame data generated by the graphic processor is sequentially transferred through the data bus and stored into the main memory. The data bus satisfies $R1 \geq R2 \geq R4$ and $R1 \geq R3 \geq R4$, where R1 is the data transmission rate from the main processor to the graphic processor, R2 is the data transmission rate from the graphic processor to the main processor, R3 is the data transmission rate between the main processor and the main memory, and R4 is the rate to transmit a single image frame of data within a vertical blanking interval.

8 Claims, 3 Drawing Sheets

INFORMATION PROCESSING DEVICE, DATA TRANSMISSION METHOD, AND ELECTRONIC APPARATUS

CROSS-REFERENCE TO RELATED APPLICATION

This application is a continuation of International Application PCT/JP2005/010830 filed on Jun. 14, 2005, pending at the time of filing of this continuation application and claims priority from Japanese Patent Application 2004-293459 filed on Oct. 6, 2004, the contents of which are herein wholly incorporated by reference.

BACKGROUND OF THE INVENTION

1. Field of the Invention

The invention relates to an information processing technology, and more particularly to an information processing device having a graphic processor for executing image processing operations, and a data transmission method of that device.

2. Description of the Related Art

Computer graphics technologies and image processing technologies for use in the fields of computer games, digital broadcasting, and the like have made significant progress in recent years. Information processing devices such as computers, game consoles, and television sets are thus in need of capabilities for processing image data of higher definitions at higher speed accordingly. These information processing devices are then equipped with a graphic processor dedicated to image processing aside from their main processors for ordinary arithmetic processing, so that the main processors are freed from image processing for reduced system overhead.

In order for these information processing devices to achieve sophisticated arithmetic processing, it is effective to constitute their main processors as multiprocessors. Multiprocessors assign a plurality of tasks to a plurality of processors thereof for parallel processing. Meanwhile, graphic processors perform image processing corresponding to the plurality of tasks processed by the main processors, so as to correspond to the high-speed operations of the main processors. The resulting image frames and other data are typically stored into memories once and displayed on displays or the like in order.

As computer images, television images, and the like grow in definition, and the image data increases in size, memories of greater capacities have become necessary to store the image data generated by the graphic processors. Moreover, performing image processing at high speed and making screen display at high frame rates requires main processors which are capable of high-speed processing, and memories that can be accessed at high speed by the graphic processors and the like. In response to these demands, the devices are ever increasing in total cost, thereby creating a high barrier against the prevalence of the devices and their application technologies.

SUMMARY OF THE INVENTION

The present invention has been achieved in view of the foregoing problems. It is thus an advantage of the present invention to provide a technology for achieving high-definition image processing at low cost.

One of the embodiment of the present invention relates to an information processing device. This information processing device comprises: a main processor which exercises centralized control on the entire device, the main processor including a plurality of operating units; a graphic processor which executes an image processing operation; and a main memory which stores data including image frame data. A data bus to be shared between the plurality of operating units in the main processor is connected at one end to the graphic processor and at the other end to the main memory.

The graphic processor may transfer generated image frame data to the main memory through the data bus via the main processor. The graphic processor may have a graphic memory which stores the generated image frame data temporarily.

Incidentally, any combinations of the foregoing components, and any conversions of expressions of the present invention from/into methods, apparatuses, systems, computer programs, and the like are also intended to constitute applicable aspects of the present invention.

DETAILED DESCRIPTION OF THE INVENTION

Figure 1:
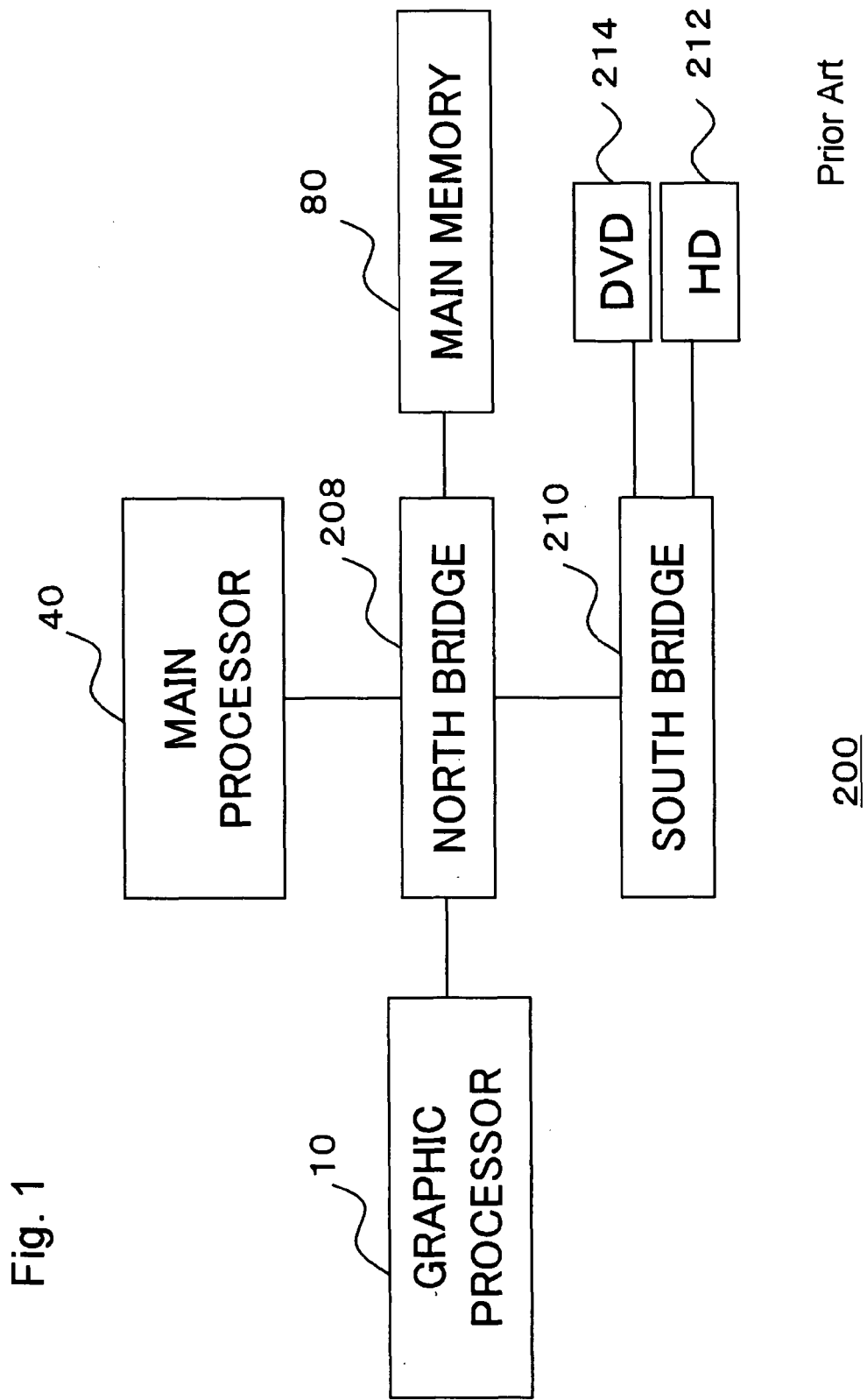
FIG. 1 is a diagram showing an example of the configuration of a typical personal computer.

In order to clarify the features of the present embodiment, a typical configuration of an information processing device having image processing functions will initially be described with reference to FIG. 1. FIG. 1 is a diagram showing an example of the configuration of a typical personal computer 200. For efficient image processing, the personal computer 200 is generally provided with a graphic processor 10 and a main memory 80 aside from a main processor 40. The main processor 40 exercises control on the entire device and performs related calculations. The graphic processor 10 is dedicated to image processing operations. The main memory 80 stores programs, and data necessary for executing the programs. The main processor 40, the graphic processor 10, and the main memory 80 each are connected to a circuit called north bridge 208. The north bridge 208 is intended for bus control, and provides transceiver functions and arbitration functions among a plurality of buses. In the north bridge 208, buses connected to such components as the main processor 40, the graphic processor 10, and the main memory 80 are controlled so that desired data can be transmitted between the components. The north bridge 208 is also connected to a circuit intended for input and output control, called south bridge 210. The south bridge 210 is connected with input and output units such as a hard disk unit 212 and a DVD (Digital Versatile Disk) drive unit 214.

The typical personal computer 200 is also provided with a not-shown graphic memory which is put under the control of the graphic processor 10. The graphic memory stores data on image frames and fields (hereinafter, referred to collectively as "image frames") generated by image processing in the graphic processor 10, and data necessary for the image processing. The graphic memory may sometimes be incorporated into the graphic processor 10. Alternatively, a dedicated area serving as the graphic memory may be allocated in the main memory 80. When the graphic memory is incorporated into the graphic processor 10, it can transmit data to/from functional blocks in the graphic processor 10 at high speed, though with an increase in the manufacturing cost of the device. When part of the main memory 80 is used as the graphic memory, a broadband data bus must be reserved between the main memory 80 and the graphic processor 10 so that image frame data can be transmitted to a display unit at high frame rates. This means difficulties in design. This problem becomes more apparent as the image frames increase in data size.

Even when the main processor 40 is given a multiprocessor configuration for speedup, the foregoing problems make it difficult to display fine images at high frame rates while suppressing an increase in cost. As above, the inventor has recognized the importance of promoting the efficiency of data transmission between the processor and the memory, and has conceived the configuration as shown in the present embodiment.

Figure 2:
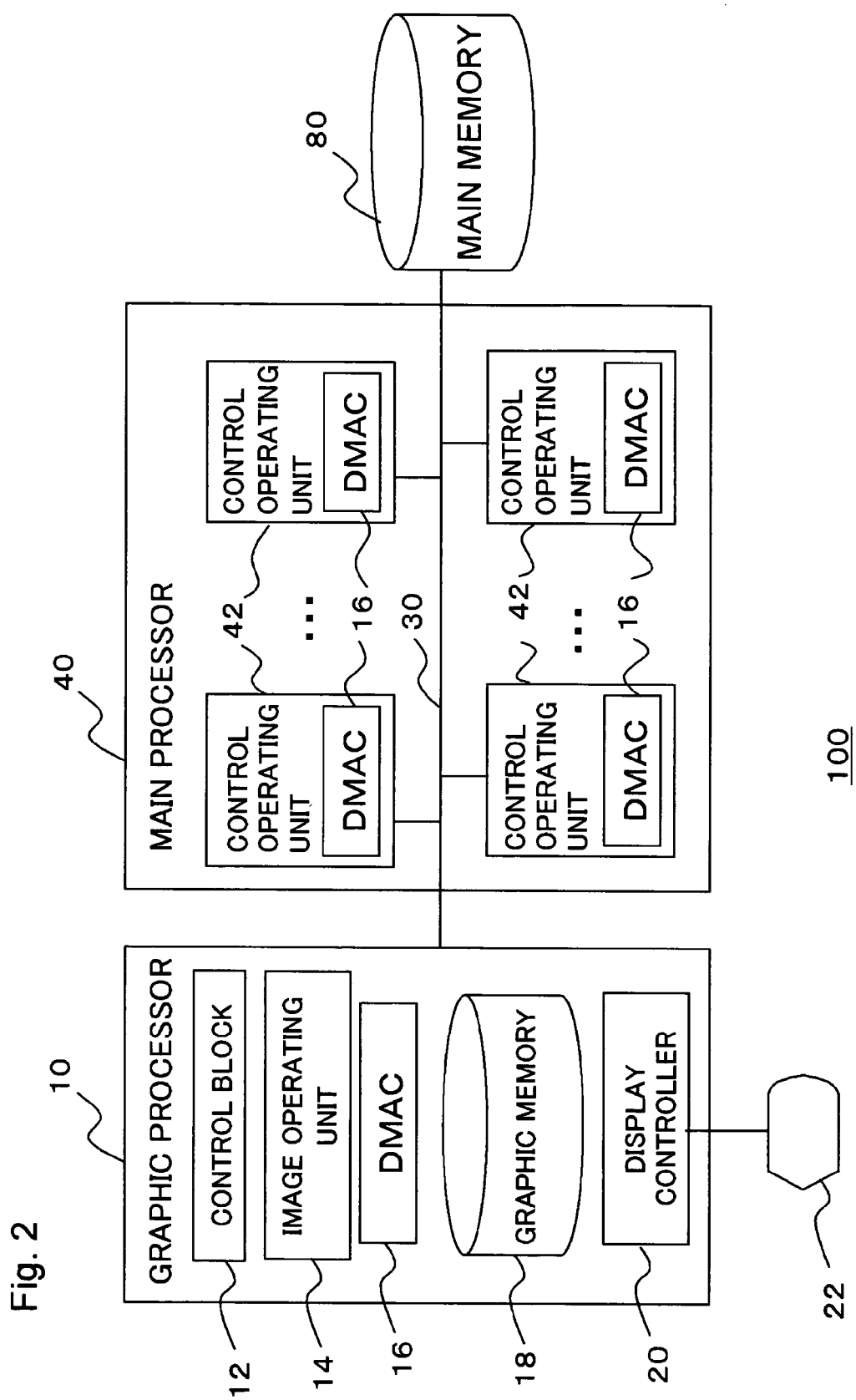
FIG. 2 is a block diagram showing the configuration of the information processing device according to an embodiment.

FIG. 2 is a block diagram showing the configuration of an information processing device 100 according to the embodiment of the present invention. The information processing device 100 includes a graphic processor 10, a main processor 40, and a main memory 80. The graphic processor 10 and the main memory 80 are connected to each other via a data bus 30 which is shared among a plurality of control operating units 42 in the main processor 40. It will be understood by those skilled in the art that these functional blocks may be achieved in various forms including hardware alone, software alone, and a combination of these, and not limited to any one of them.

This information processing device 100 runs an operating system which provides functions and environment for effective use of the information processing device 100, and exercises centralized control on the entire device. A plurality of application programs (hereinafter, referred to simply as applications) are executed on the operating system.

The main processor 40 includes a plurality of control operating units 42 which process tasks corresponding to the applications in parallel. The control operating units 42 have respective DMA controllers 16 inside. By activating the internal DMA controllers 16, the control operating units 42 can transfer data mutually via the data bus 30 and can transfer data to/from the graphic processor 10 or the main memory 80. One of the control operating units 42 may be selected as a management processor. The management processor may divide the tasks corresponding to a plurality of applications in a time-shared fashion, and may assign the tasks corresponding to the respective applications to the other control operating units 42 in units of time slices for execution. The control operating unit 42 serving as the management processor may control data transmission of the other control operating units 42 by activating their DMA controllers 16 inside.

As with the configuration of the typical personal computer of FIG. 1, the main processor 40 may further be connected to a south bridge so that it is capable of input and output from/to a hard disk unit, a DVD drive unit, and the like (not shown).

The graphic processor 10 is a block or unit dedicated to image-related processing, and performs rendering etc. The graphic processor 10 includes a control block 12, an image operating unit 14, a DMA controller 16, a graphic memory 18, and a display controller 20. These blocks are connected to each other with not-shown internal buses, and transmit and receive data signals to/from each other.

The control block 12 is one for controlling the entire graphic processor 10. The control block 12 exercises centralized control on the image operating unit 14, the DMA controller 16 in the graphic processor 10, the graphic memory 18, and the display controller 20, and performs a synchronization management on data transmission between the blocks, interruption processing, a timer management, and other processings.

The image operating unit 14 performs various image-related arithmetic processing under the control of the control block 12. Among the examples of the processing is a series of rendering processes by which image frame data is generated from three-dimensional modeling data through coordinate transformation, hidden surface elimination, and shading, and is written to the graphic memory 18. In order to perform the processing pertaining to three-dimensional graphics at high speed in particularly, the image operating unit 14 may include such functional blocks as a not-shown rasterizer, a shader unit, and a texture unit.

The DMA controller 16 of the graphic processor 10 controls the data transmission of the graphic processor 10 to/from the control operating units 42 in the main processor 40 and the main memory 80, under instructions from the control block 12. In the present embodiment, image frame data generated in the graphic processor 10 is sequentially transferred to the main memory 80 through the data bus 30 by activating the DMA controller 16 in the graphic processor 10.

The graphic memory 18 is a memory area dedicated to graphics-related data to be used and managed by the graphic processor 10. Aside from its frame buffer, Z buffer, and the like for storing image frame data temporarily, the graphic memory 18 may also include an area for storing basic data to be referred to in drawing the image frame data, such as vertex data, texture data, and color lookup tables.

For example, image frame data resulting from rasterization, shading, and the like in the image operating unit 14 is once written to the frame buffer. The image operating unit 14 may also apply fogging, alpha blending, and other processing to the image frame data written in the frame buffer, thereby determining final drawing colors for data update.

The display controller 20 generates horizontal and vertical synchronizing signals. According to the display timing of a display unit 22, the display controller 20 reads pixel data out of the image frame data stored in the main memory 80 line by line in succession. Moreover, the display controller 20 converts the pixel data read line by line from the form of digital data consisting of RGB color values into a format compatible to the display unit 22, and outputs the resultant.

Next, description will be given of the process by which the configuration shown in FIG. 2 performs image processing.

Initially, the control operating units 41 of the main processor 40 are processing tasks corresponding to currently-running applications in parallel. Suppose here that the need for data to be transmitted between the control operating units 42 arises, such as when a control operating unit 42 serving as the management processor for controlling the other control operating units 42 transfers control-related data to the other control operating units 42. Then, the control operating units 42 activate their DMA controllers 16 inside and perform data transmission by using the data bus 30.

In the present embodiment, the data bus 30 shared among the control operating units 42 is also connected to the main memory 80. As a result, data obtained resulting from operations in the control operating units 42 can be transferred directly to the main memory 80 by activating the DMA controllers 16 in the respective control operating units 42.

If any need for image processing arises while the control operating units 42 are processing the tasks, the main processor 40 requests the graphic processor 10 to perform the image processing. In the graphic processor 10, the control block 12 accepts the request for the image processing from the main processor 40, and exercises control so that the processing is performed in the image operating unit 14. In the present embodiment, the data bus 30 shared among the control operating units 42 in the main processor 40 is also connected to the graphic processor 10. Texture data and drawing primitive data necessary for the image operating unit 14 to perform the image processing are thus transmitted from the control operating units 42 through the data bus 30, and stored into the graphic memory 18. Here, the graphic processor 10 may issue data transfer commands by activating the DMA controller 16 in the graphic processor 10 depending on the internal state of processing. Alternatively, the DMA controllers in the control operating units 42 may be activated at the time of requesting the image processing so that the transfer commands are issued from the control operating units 42. Moreover, the data may be once transferred from the control operating units 42 to the main memory 80 through the data bus 30. The data is then transferred from the main memory 80 to the graphic memory 18 when the graphic processor 10 activates the DMA controller 16 in the graphic processor 10 in accordance with the internal state of processing. In this case, the control operating units 42 shall transmit such information as the addresses of locations where the necessary data is stored in the main memory 80 to the graphic processor 10 when requesting the image processing of the graphic processor 10.

The image frame data generated by the image operating unit 14 is sequentially transferred to the main memory 80 through the data bus 30 by activating the DMA controller 16 in the graphic processor 10. Here, the graphic memory 18 may be used as a temporary memory area before transfer.

The image frame data sequentially stored in the main memory 80 is read and transmitted by the display controller 20 in accordance with the display timing of the display unit 22. The image frame data is thus transferred to the display unit 22 through the data bus 30 and the graphic processor 10 in succession.

The display unit 22 typically draws an image frame by drawing the scan lines of the screen left to right or top to bottom in succession. When the bottom right of the screen is reached, the scan line returns to the top left again to draw the next image frame. The time for the scan line to return from the bottom right to the top left of the screen is called vertical blanking interval, which is approximately 670 μs. Each single image frame must be transmitted from the main memory 80 to the graphic processor 10 within this vertical blanking interval. For example, in the cases of high-definition TV pictures or the like where a screenful of image having a transfer size of 8 MB is displayed, the data bus 30 requires a transfer rate of 8 MB/670 μs≈12 GB/s.

In the present embodiment, the broadband data bus 30 by which the individual control operating units 42 are connected in the multiprocessor system is simply extended up to the main memory 80 and the graphic processor 10. The high-speed data transmission is thus achieved easily. To complete the transfer in a single clock, the bus width W of the data bus 30 is set to satisfy the inequality $S \leq WF$, where S is the transfer rate necessary for the foregoing image display and F is the clock frequency. For example, if the data bus 30 is given a bus width of 64 bits, a transfer rate of 20 GB/s can be obtained at a clock frequency of 5 GHz. When this data bus 30 is used to transfer image frame data from the main memory 80 to the graphic processor 10, it is sufficiently possible to display 8 MB-class high-definition images, such as high-definition TV pictures mentioned above, without dropping frames while allowing for data transfer other than the image data, for a practical rate, and so on.

In the present embodiment, the image frame data generated by the graphic processor 10 is transmitted to the main memory 80 sequentially, and thus the graphic memory 18 in the graphic processor 10 does not require a large capacity. A buffering capacity as much as a single frame is not free of concern about an overflow, whereas too large a memory capacity can cause problems in cost and design. The graphic memory 18 is thus given a capacity equivalent to two frames or smaller, for example. Since the role of the graphic memory 18 implemented in the graphic processor 10 is partly committed to the main memory 80 and the capacity of the graphic memory 18 is minimized, it is possible to manufacture high-performance information processing devices at low prices and to promote the prevalence of the devices. Design is also facilitated.

Figure 3:
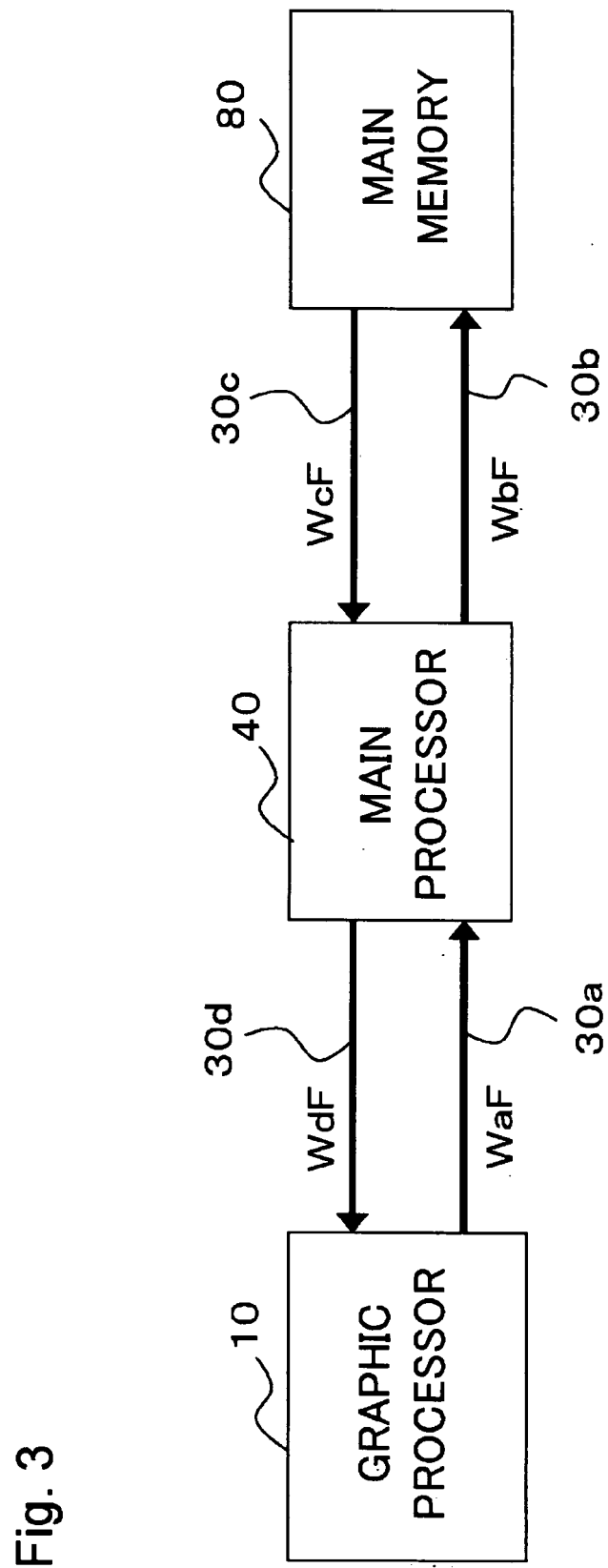
FIG. 3 is a diagram for explaining the transmission rate of the data bus according to the present embodiment.

FIG. 3 is a diagram for explaining the transmission rate of the data bus 30 according to the present embodiment. The data bus 30 is composed of data buses 30a to 30d. The data buses 30a and 30b are intended to transfer generated image frame data from the graphic processor 10 to the main memory 80 via the main processor 40. The data buses 30c and 30d are intended for transfer from the main memory 80 to the graphic processor 10 via the main processor 40. In order for the information processing device of the present embodiment to exert sufficient effects in processing high-definition images, the data buses 30a to 30d shall have the following bus widths. That is, these data buses are configured to satisfy at least the condition that $S \leq WaF, WbF, WcF, WdF$, where Wa is the bus width of the data bus 30a, Wb is the bus width of the data bus 30b, Wc is the bus width of the data bus 30c, Wd is the bus width of the data bus 30d, S is the transmission rate at which a single image frame can be transmitted within the vertical blanking interval, and F is the clock frequency. This precludes a delay in sending out image frame data to the display unit 22 ascribable to the data transmission processing between the graphic processor 10 and the main memory 80.

The data bus 30d extending from the main processor 40 to the graphic processor 10 is required to transfer texture data, drawing primitive data, and other data necessary for image processing when the main processor 40 requests the image processing of the graphic processor 10. Providing a yet higher transfer rate for the data bus 30d precludes the transfer of the image frame data from being interfered with data transfer necessary for such image processing. The bus widths are thus determined so that $S \leq WaF, WbF, WcF \leq WdF$. Here, assuming the image frames of 8 MB mentioned above, the bus widths are determined so that the transmission rates WaF, WbF, WcF, and WdF reach or exceed 12 GB/s.

With the foregoing configuration, images can be displayed on the display unit 22 without delay even under the conditions of the present embodiment that image frame data is stored in the main memory 80 and the data bus 30 extending to/from the graphic processor 10 is also used to transmit other data. This configuration is advantageous in terms of manufacturing cost and in design as compared to the cases where a high-capacity graphic memory is provided separately and where a special bus is provided for graphics use.

In the present embodiment, a bus originally provided in the main processor 40 is utilized to establish connection between the graphic processor 10 and the main memory 80. In particular, the multiprocessor structure has broadband buses, and thus is sufficiently capable of the high-rate data transmission according to the present embodiment. This configuration is advantageous in terms of packaging area and timing design since it eliminates the need to lay a number of buses inside the chip.

Up to this point, the present invention has been described in conjunction with the embodiment thereof. The foregoing embodiment has been given solely by way of illustration. It will be understood by those skilled in the art that various modifications may be made to combinations of the foregoing components and processes, and all such modifications are also intended to fall within the scope of the present invention.

The embodiment has dealt with the case where the data bus 30 is shared by the graphic processor 10, the main processor 40, and the main memory 80. With the same configuration, the graphic processor 10 may be replaced with a processor having different functions. For example, a plurality of blocks having the functions of the main processor 40 of the present embodiment may be provided and connected to the main memory with the single data bus. Even in this case, it is possible to transfer large sizes of data at high speed without the provision of memories for the respective blocks. A highly reliable device can thus be achieved at low price.

As above, the present invention is applicable to electronic apparatuses which handle large sizes of data, such as computers, game consoles, and television sets.

What is claimed is:

1. An information processing device comprising:
   a main processor which exercises centralized control on the entire device, the main processor including a plurality of operating units;
   a graphic processor which executes an image processing operation;
   a main memory which stores data including image frame data which is generated by the graphic processor; and
   a data bus used for internal data transmission from one of the plurality of operating units to the other operating units in the main processor, the data bus being directly, without any intervening elements, connected at one end to the graphic processor and at the other end to the main memory, wherein
   the data bus is shared by the plurality of operating units for the internal data transmission in the main processor, and by the graphic processor and the main memory for the transmission of data including the image frame data therebetween, and
   the image frame data is transmitted from the graphic processor to the main memory via the data bus and again transmitted via the bus in opposite direction to be directly output to an image display unit connected to the graphic processor according to a display timing.

2. The information processing device according to claim 1, wherein the graphic processor has a direct memory access (DMA) controller which transfers generated image frame data to the main memory.

3. The information processing device according to claim 1, wherein the data bus is configured to satisfy $$R1 \geq R2 \text{ and } R1 \geq R3,$$

where R1 is a data transmission rate from the main processor to the graphic processor, R2 is a data transmission rate from the graphic processor to the main processor, and R3 is a data transmission rate between the main memory and the main processor.

4. The information processing device according to claim 1, wherein the data bus is configured to satisfy $$R1 \geq R4, R2 \geq R4, \text{ and } R3 \geq R4,$$

where R1 is a data transmission rate from the main processor to the graphic processor, R2 is a data transmission rate from the graphic processor to the main processor, R3 is a data transmission rate between the main memory and the main processor, and R4 is a data transmission rate necessary to transmit image frame data from the information processing device to an image display unit connected to the information processing device so that the image frame data is displayed on the image display unit in real time.

5. The information processing device according to claim 1, wherein:
   the graphic processor has a graphic memory which stores image frame data; and
   the graphic memory has a capacity smaller than or equal to the data size of two image frames.

6. The information processing device according to claim 1, further comprising a display controller which reads pixel data out of the image frame data stored in the main memory line by line in succession and outputs the pixel data to the image display unit.

7. A data transmission method of an information processing device, the device comprising: a main processor which exercises centralized control on the entire device, the main processor including a plurality of operating units; a graphic processor which executes an image processing operation; a main memory which stores data including image frame data which is generated by the graphic processor; and a data bus used for internal data transmission from one of the plurality of operating units to the other operating units in the main processor, the data bus being directly, without any intervening elements, connected at one end to the graphic processor and at the other end to the main memory,
   the method comprising performing transmission of data including the image frame data between the graphic processor and the main memory via the data bus shared with the plurality of operating units for the internal data transmission in the main processor, the image data being transmitted from the graphic processor to the main memory via the data bus, and again transmitted via the bus in opposite direction to be directly output to an image display unit connected to the graphic processor according to a display timing.

8. An electronic apparatus comprising:
   the information processing device according to claim 1; and
   an image display unit which outputs image frame data generated by the information processing device.

* * * * *